United States Patent
Tsai et al.

(10) Patent No.: US 6,252,184 B1
(45) Date of Patent: Jun. 26, 2001

(54) DROPLET PROOF KEYBOARD FOR NOTEBOOK COMPUTER

(75) Inventors: Ching Cheng Tsai, Keelung; Wen To Chou, Taipei Hsien, both of (TW)

(73) Assignee: Chicony Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 09/577,604

(22) Filed: May 25, 2000

(51) Int. Cl.[7] .................................................. H01H 13/70
(52) U.S. Cl. ....................... 200/5 A; 200/344; 200/302.2; 200/517
(58) Field of Search ...................... 200/5 A, 517, 200/344, 345; 400/490, 491, 491.2, 495, 495.1, 496

(56) References Cited

U.S. PATENT DOCUMENTS

| | | | |
|---|---|---|---|
| 5,280,147 | * 1/1994 | Mochizuki et al. | 200/344 |
| 5,767,468 | * 6/1998 | Tsai | 200/344 |
| 5,950,810 | * 9/1999 | Pan et al. | 200/344 |
| 5,973,281 | * 10/1999 | Tsai | 200/344 |
| 6,011,227 | * 1/2000 | Yoneyama | 200/344 |
| 6,100,482 | * 8/2000 | Koma et al. | 200/344 |

* cited by examiner

*Primary Examiner*—Michael Friedhofer
(74) *Attorney, Agent, or Firm*—Rosenberg, Klein & Lee

(57) ABSTRACT

A droplet proof keyboard for notebook computer comprises a base; a circuit membrane set on the base; a mounting plate on the circuit membrane set and having a through hole and a plurality of retaining parts for each keyswitch; a rubber cone set having a plurality of rubber cones, each rubber cone having a press part passing the through hole and touching the circuit membrane when the keyswitch is pressed; a plurality of key caps each corresponding to a keyswitch and having locking parts on lower surface thereof; an opaque plate arranged on the mounting plate and clamping the rubber cone; the opaque plate having an opening for each rubber cone and a plurality of slits through which lower ends of a switching lever passing; a switching lever set having a plurality of switching levers; each switching lever having a plurality of upper ends pivotally arranged on the locking parts of the keycap and a plurality of lower ends pivotally arranged on the retaining parts of the mounting plate. There is no aperture below the mounting plate and the circuit membrane set is not influenced by droplet.

2 Claims, 6 Drawing Sheets

DROPLET PROOF KEYBOARD FOR NOTEBOOK COMPUTER

FIELD OF THE INVENTION

The present invention relates to a keyboard for notebook computer, especially to a droplet proof keyboard for notebook computer.

BACKGROUND OF THE INVENTION

FIGS. 5 and 6 shows the conventional keyboard for notebook 9. The keyswitch of the keyboard comprises a cap 7 and a switching lever 6 arranged on an opaque plate 5 stacked on a circuit membrane 2 and a base 8. The four lower ends of the switching lever 6 are fixed on a retaining structure 81 on the base 8 through four holes 27 on the circuit membrane 2. The four through holes 27 are formed on the circuit membrane 2 and corresponding to one switching lever 6 of a keyswitch. Therefore, there are many through holes 27 on the keyboard such that droplet may permeate into the keyboard. Once droplet permeates into keyboard, the repair is both time and cost consuming.

It is the object of the invention to provide a droplet proof keyboard for notebook computer, whereby the performance of the keyboard is not influenced by droplet.

In one aspect of the present invention, the circuit membrane is shifted to a lower position and having a closed structure atop the circuit membrane.

To achieve the above object, the present invention provides a droplet proof keyboard for notebook computer comprising a base; a circuit membrane set on the base; a mounting plate on the circuit membrane set and having a through hole and a plurality of retaining parts for each keyswitch; a rubber cone set having a plurality of rubber cones, each rubber cone having a press part passing the through hole and touching the circuit membrane when the keyswitch is pressed; a plurality of key caps each corresponding to a keyswitch and having locking parts on lower surface thereof; an opaque plate arranged on the mounting plate and clamping the rubber cone; the opaque plate having an opening for each rubber cone and a plurality of slits through which lower ends of a switching lever passing; a switching lever set having a plurality of switching levers; each switching lever having a plurality of upper ends pivotally arranged on the locking parts of the keycap and a plurality of lower ends pivotally arranged on the retaining parts of the mounting plate. There is no aperture below the mounting plate and the circuit membrane set is not influenced by droplet.

The various objects and advantages of the present invention will be more readily understood from the following detailed description when read in conjunction with the appended drawing, in which:

DETAILED DESCRIPTION OF THE PREFERRED EMBODIMENT

Figures 1, 1A:
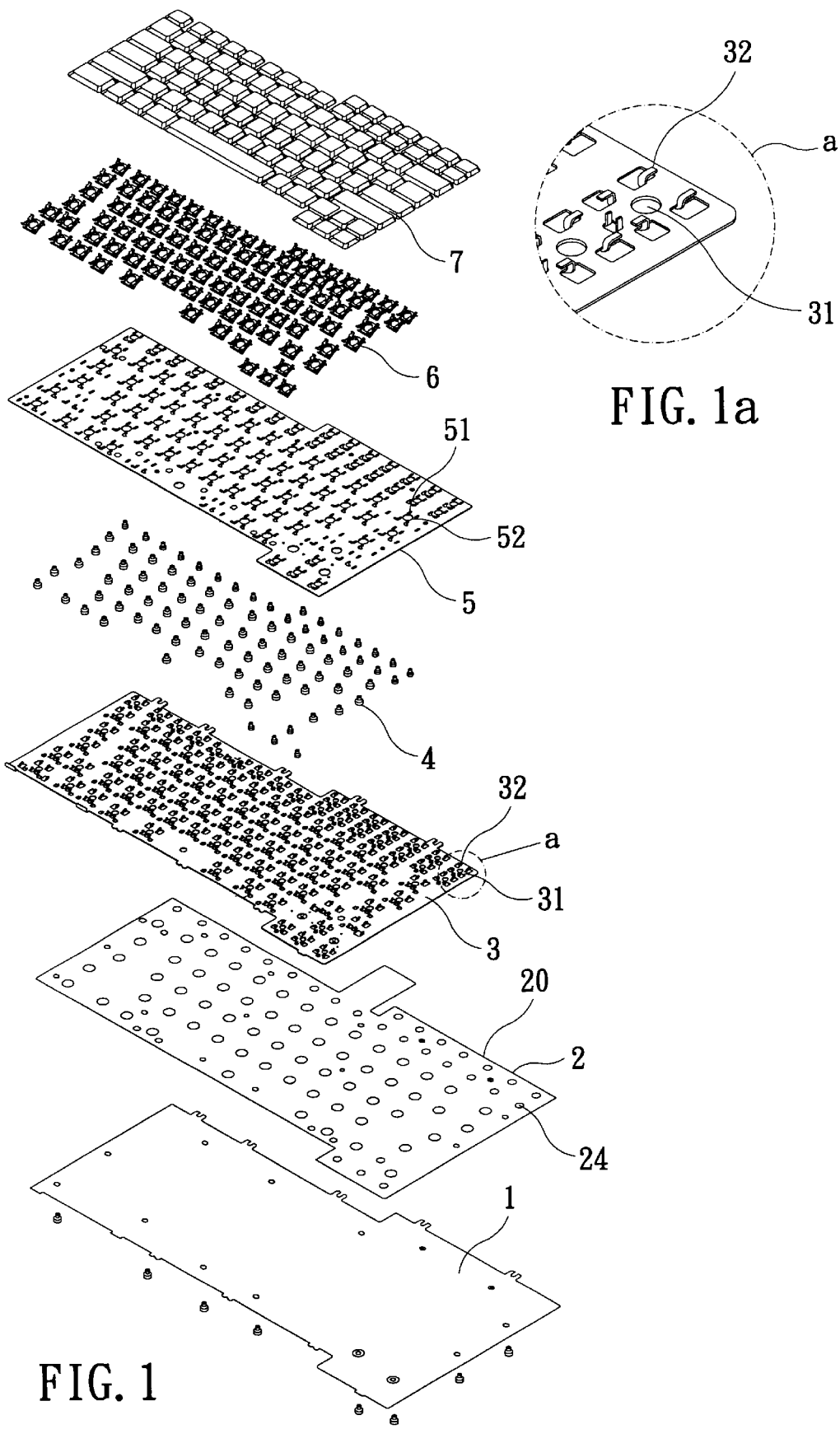
FIG. 1 is an exploded view of the present invention.
FIG. 1A is a partially enlarged view of part a in FIG. 1.
Figure 2:
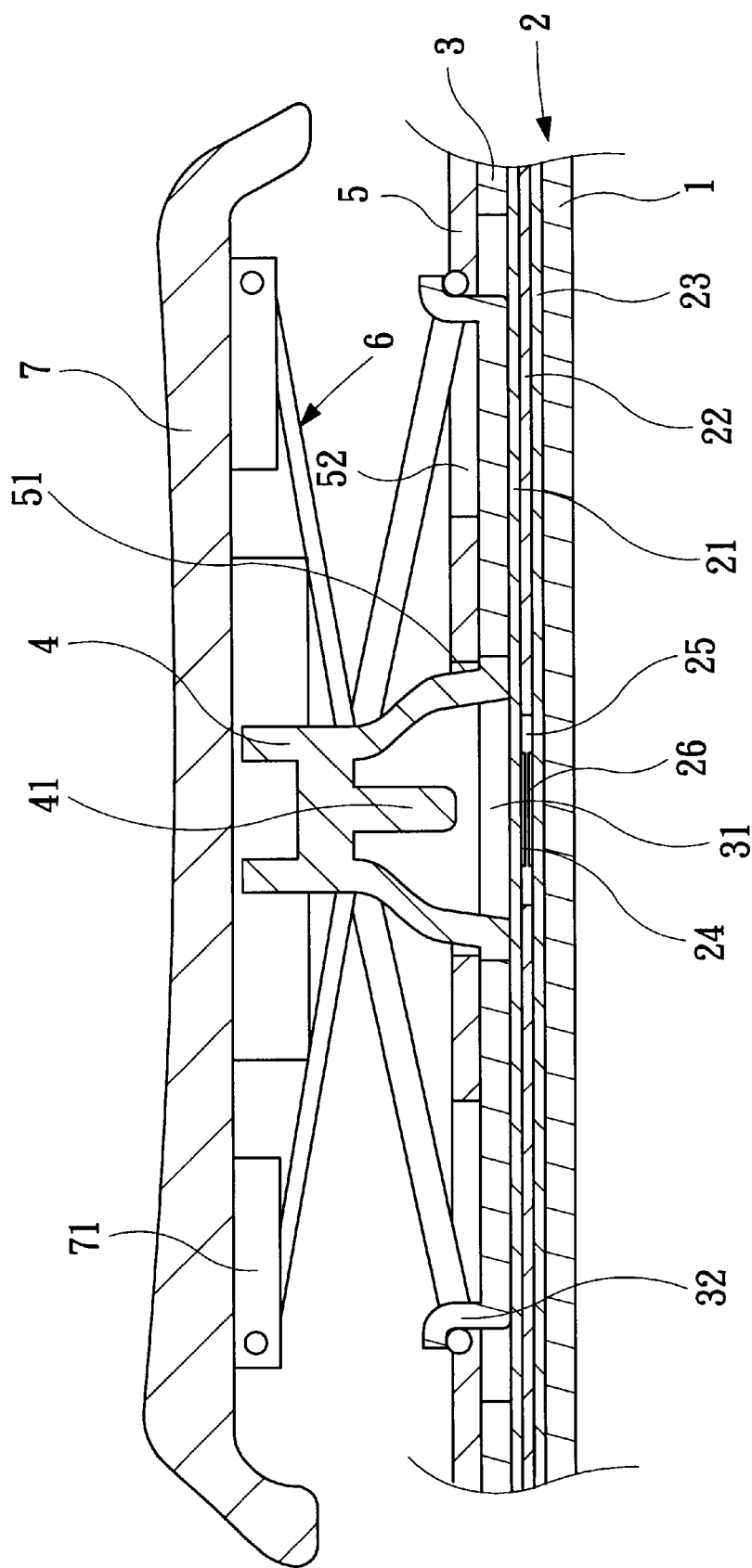
FIG. 2 shows a sectional view of a keyswitch in the present invention.
Figure 3:
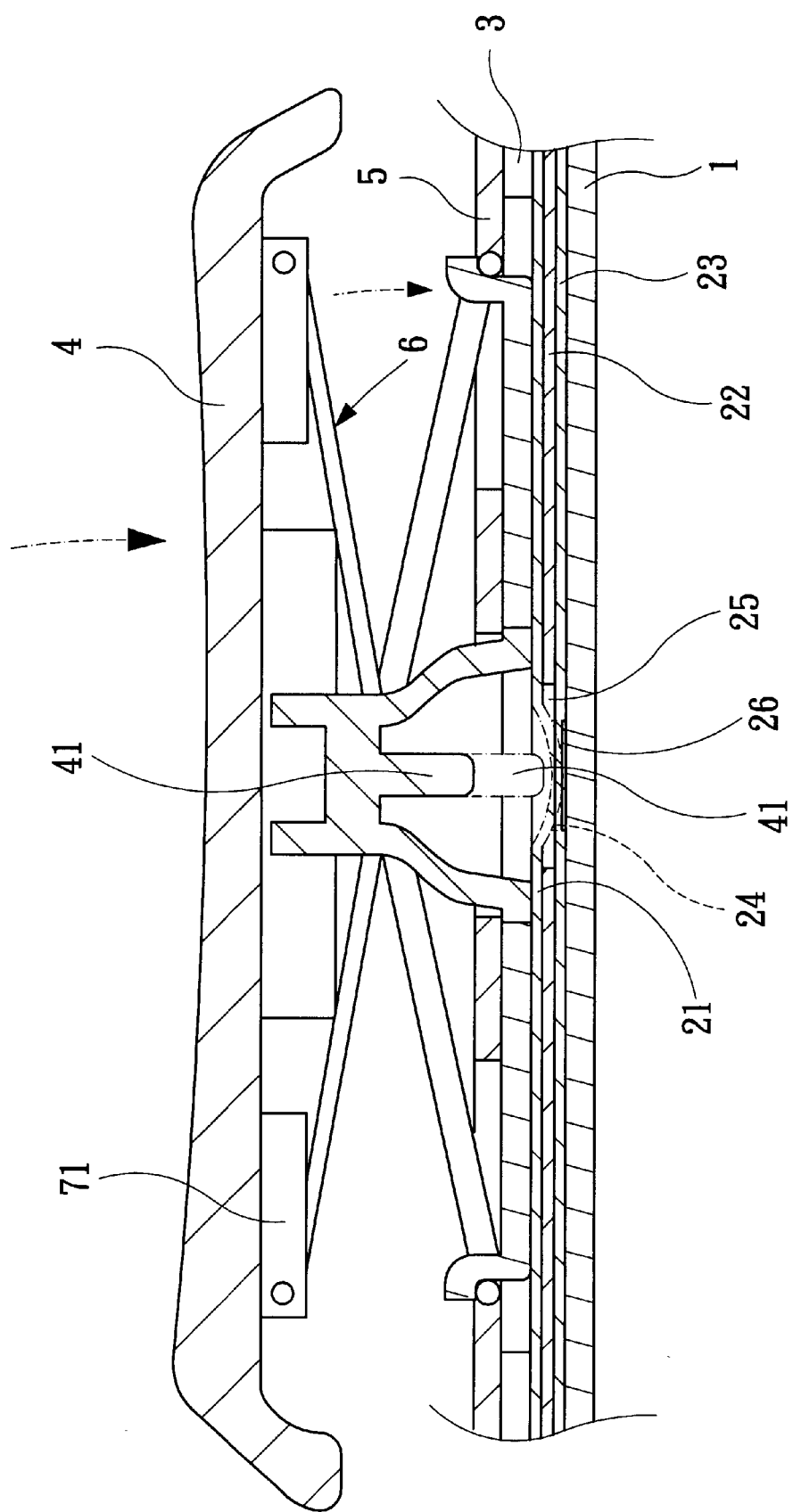
FIG. 3 shows a sectional view of a keyswitch in operation in the present invention.
Figure 4:
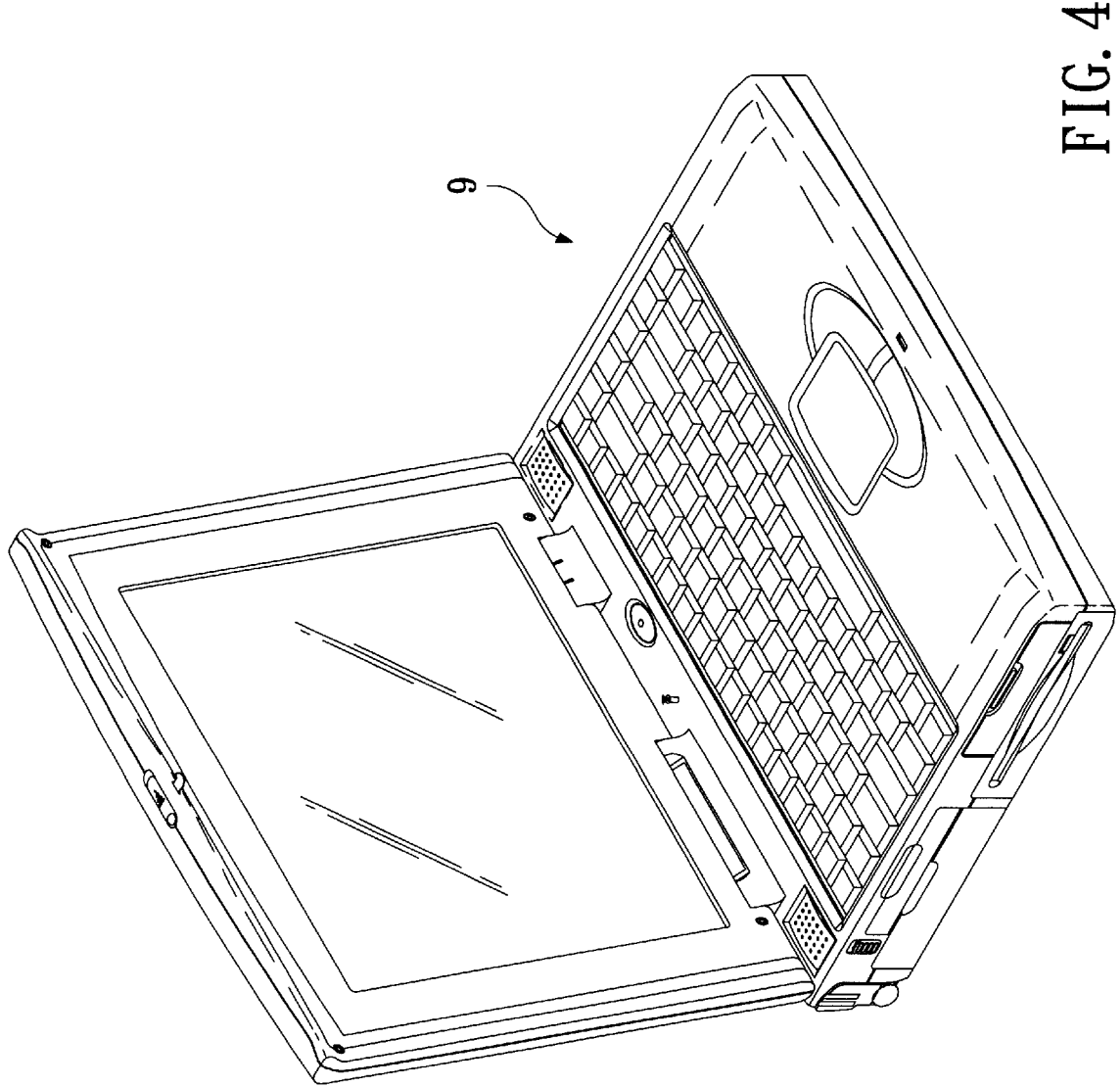
FIG. 4 is a perspective view of the present invention.
Figure 5:
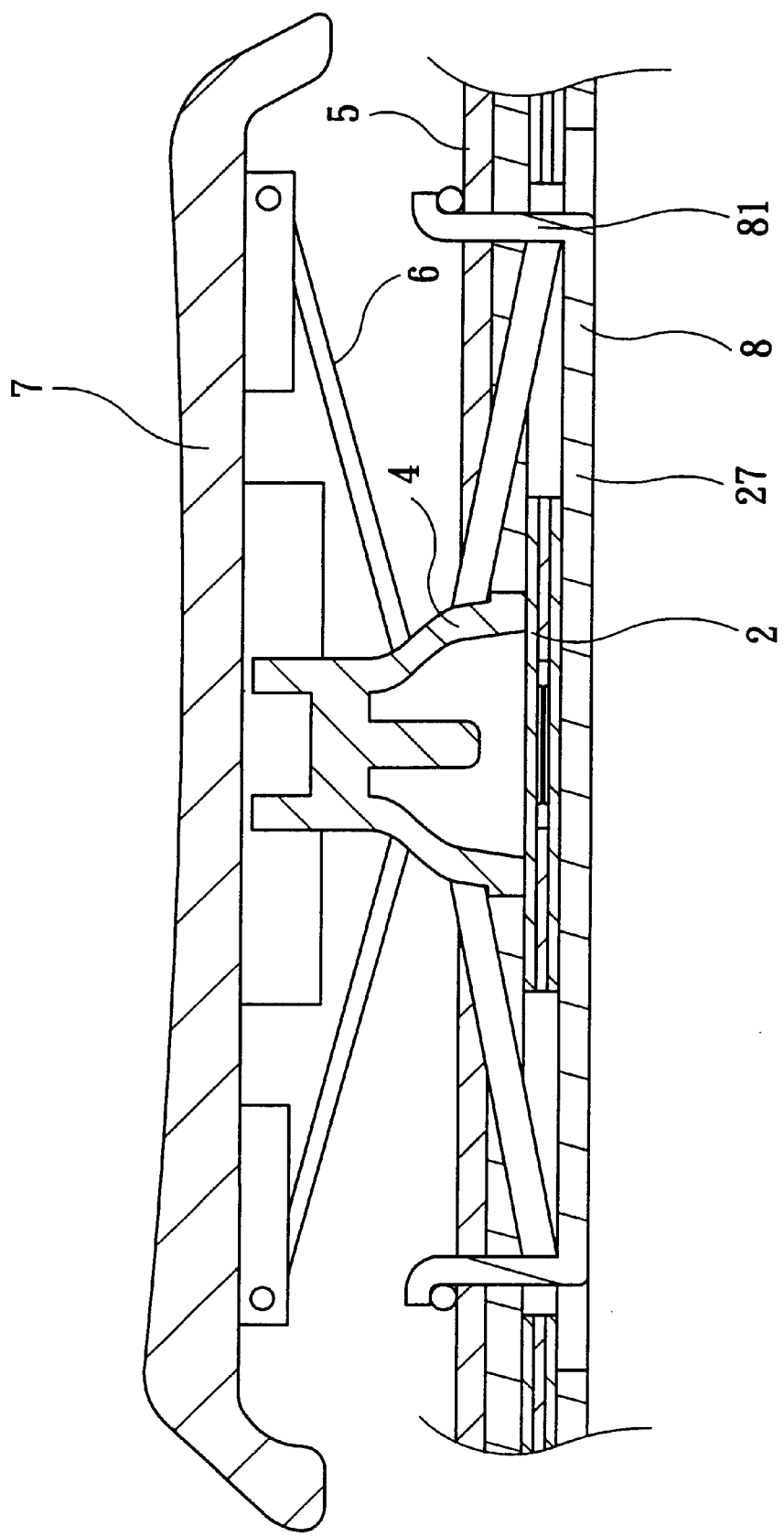
FIG. 5 is a sectional view of a prior art keyswitch.
Figure 6:
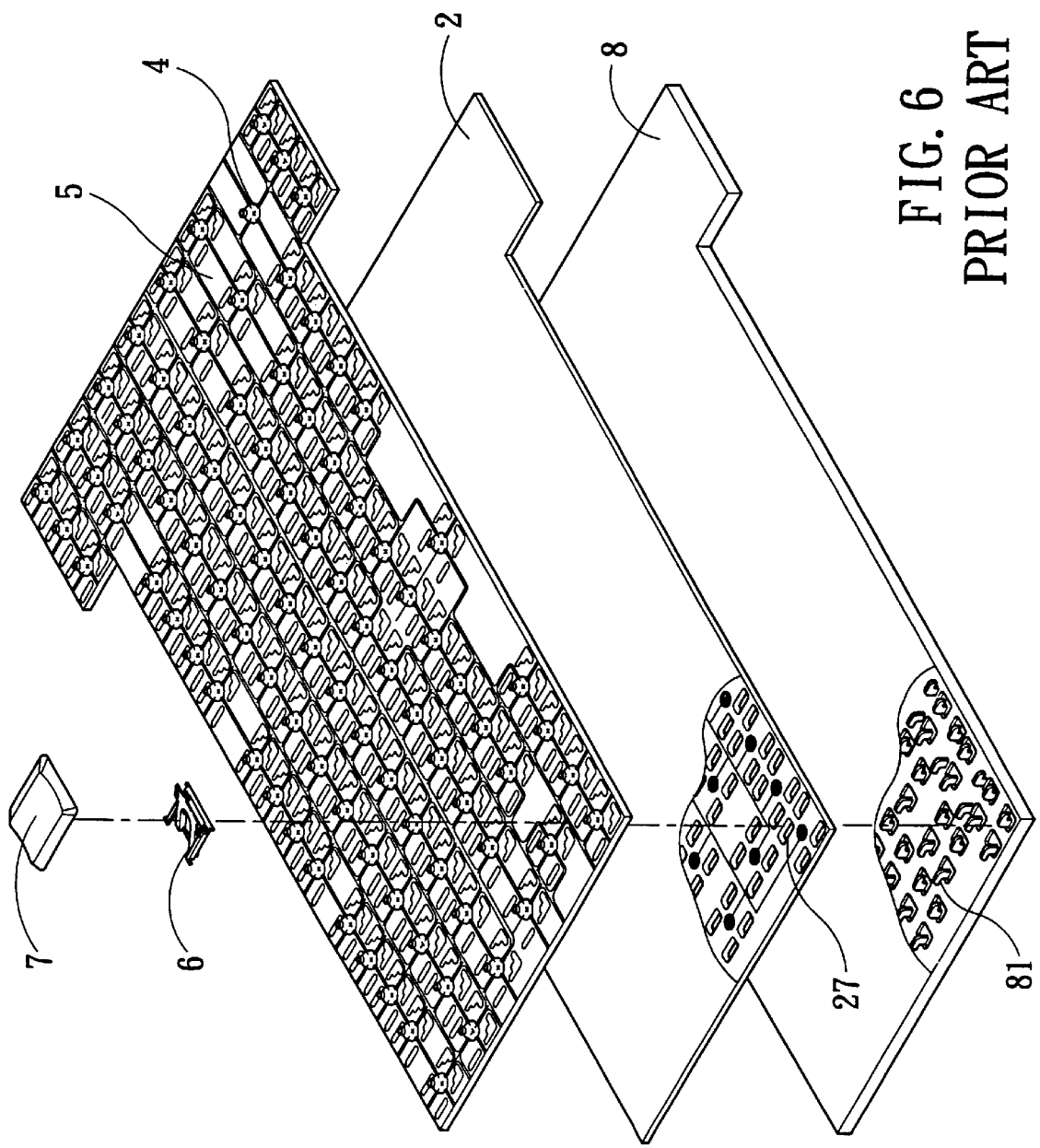
FIG. 6 is an exploded view of a prior art keyboard.

As shown in FIGS. 1 to 4, the present invention is intended to provide a droplet proof keyboard for notebook computer. The droplet proof keyboard for notebook computer has a base 1, a plurality layers of circuit membrane set 2 on the base 1. The plurality layers of circuit membrane set 2 are composed of an upper circuit membrane 21 with contacts 24, a middle circuit membrane 22 with a through hole 25 and a lower circuit membrane 23 with contacts 26. The contacts 24 are lowered through the hole 25 and in contact with the contacts 26 when the key is pressed. A mounting plate 3 is arranged on the circuit membrane set 2 and has a rubber cone set 4. The rubber cone set 4 comprises a plurality of block-shaped runner cones and each having a press part 41. The press part 41 passes through a hole 31 on the mounting plate 3 and touches the contacts 24 on the upper circuit membrane 21 of the circuit membrane set 2. A switching lever 6 is arranged on the mounting plate 3 and the mounting plate 3 has retaining parts 32 corresponding to lower ends of the switching lever 6. The rubber cone set 4 is arranged on an opaque plate 5 with opening 51 to lock the rubber cone set 4. The opaque plate 5 has slits 52 through which the upper ends of the switching lever 6 are passed and locked to locking parts 71 of a cap 7, whereby the rubber cone set 4 is fixed to the cap 7. The opaque plate 5 fulfills the clamping and light-blocking functions. Moreover, the mounting plate 3 has no structure with through hole there below, the circuit membrane set 2 have droplet proof top surface. The perimeter 20 of the circuit membrane set 2 is sealed by radio wave heating to form a droplet proof structure.

To sum up, in the droplet proof keyboard for notebook computer according to the present invention, the original base is shifted to upper position. The length of the press part is increased while the key-pressing stroke is not changed. By this design, the circuit membrane set has not opening for the switching lever. Therefore, the droplet will not influence the switching circuit in the circuit membrane set.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A moisture resistant keyboard for a computer comprising:
   (a) a base;
   (b) a sealed circuit membrane set disposed on said base defining a plurality of switch contact portions;
   (c) a mounting plate disposed on said circuit membrane, said mounting plate having formed therein a plurality of through holes and a plurality of retaining parts disposed thereabout;
   (d) a plurality of keyswitch assemblies coupled to said mounting plate, each said keyswitch assembly including:
      (1) a key cap having a plurality of locking parts formed thereon;
      (2) a lever set collapsibly supporting said key cap, said lever set extending between said locking parts of said key cap and preselected ones of said retaining parts of said mounting plate; and,
      (3) a rubber cone deflectively disposed between said key cap and said circuit membrane set for engaging one of said switch contact portions of said circuit membrane set responsive to actuation of said key cap, said rubber cone being received in one of said through holes of said mounting plate; and, (e) an opaque plate disposed on said mounting plate, said opaque plate having formed therein a plurality of openings and slits for the passage of said rubber cones and portions of said lever sets respectively therethrough, each of said openings engaging in a peripherally overlapped manner at least a portion of a corresponding one of said rubber cones for the secure retention thereof.

2. The moisture resistant keyboard as recited in claim 1, wherein said circuit membrane set includes a plurality of layers peripherally sealed one to the other by radio wave heating.

* * * * *